United States Patent [19]
Chinnaswamy et al.

[11] Patent Number: 5,235,693
[45] Date of Patent: Aug. 10, 1993

[54] METHOD AND APPARATUS FOR REDUCING BUFFER STORAGE IN A READ-MODIFY-WRITE OPERATION

[75] Inventors: Kumar Chinnaswamy, Milford; Michael A. Gagliardo, Shrewsbury; Paul M. Goodwin, Framingham; John J. Lynch, Wayland; James E. Tessari, Arlington, all of Mass.

[73] Assignee: Digital Equipment Corporation, Maynard, Mass.

[21] Appl. No.: 582,475

[22] Filed: Sep. 14, 1990

Related U.S. Application Data

[63] Continuation-in-part of Ser. No. 303,621, Jan. 27, 1989, Pat. No. 5,008,886.

[51] Int. Cl.⁵ ............................................ G06F 13/14
[52] U.S. Cl. ............................. 395/425; 364/DIG. 1
[58] Field of Search ... 364/200 MS File, 900 MS File; 395/400, 425

[56] References Cited

U.S. PATENT DOCUMENTS

| | | | |
|---|---|---|---|
| 4,648,029 | 3/1987 | Cooper et al. | 395/32 S |
| 4,797,853 | 1/1989 | Savage et al. | 395/42 S |
| 4,888,773 | 12/1989 | Arlington et al. | 364/900 |
| 5,003,465 | 3/1991 | Chisholm et al. | 395/27 S |
| 5,014,187 | 5/1991 | Debize et al. | 395/42 S |

*Primary Examiner*—Joseph L. Dixon
*Assistant Examiner*—Reba I. Elmore
*Attorney, Agent, or Firm*—Arnold, White & Durkee

[57] ABSTRACT

A method and apparatus for a read-modify-write operation in a digital computer memory system that reduces memory data path buffer storage requirements. The method latches new write data and associated mask fields into a data output buffer and then uses the latched mask fields to merge read data with the new data in the output buffer. The mask fields determine which portion of the read data is to be replaced with new data. Appropriate check bits for an error correction code (ECC) are generated and added to the modified data in the output buffer to produce a new data output which is released from the output buffer into the memory at the selected address.

14 Claims, 4 Drawing Sheets

METHOD AND APPARATUS FOR REDUCING BUFFER STORAGE IN A READ-MODIFY-WRITE OPERATION

RELATED APPLICATIONS

This application is a continuation-in-part application of the U.S. Patent application of Chinnaswamy, et al. "Improved Buffering For Read-Modify-Write Operation", Ser. No. 303,621, filed Jan. 27, 1989, now U.S. Pat. No. 5,808,886.

FIELD OF THE INVENTION

The present invention relates to data modification for digital computer memory systems, and more particularly to a method and apparatus for buffering read and write operations in a read-modify-write memory cycle.

BACKGROUND OF THE INVENTION

In a digital computer system which includes data written into memory as part of a read-modify-write operation, the data typically includes an error correction code (ECC) which extends over a number of consecutive bytes of data. When read data from the memory is to be modified by new data and then written into a selected address of the memory and the read data to be modified has a length less than the number of bytes necessary to generate the associated check bits for the error correction code (ECC), it is then necessary to read the entire selected address before merging the new data with the read data in order to properly generate new ECC check bits for the modified data which is rewritten. For instance, in the typical read-modify-write memory cycle, if four consecutive bytes of read data are necessary to generate corresponding check bits for the error correction code (ECC), and if only one byte of data of four consecutive bytes of read data is to be modified, then it is nevertheless necessary to read the entire four bytes of data in order to generate check bits for the modified data.

The procedure generally used for read-modify-write operations as described above has involved a read buffer for storing the entire contents of the memory address selected for modification with new data and a write buffer for storing the modified data for the selected memory address until the modified data could be rewritten. In addition, when two write commands were required, there would be a separate input data buffer for each command. The large amount of buffer storage required in the generally used read-modify-write data path is undesirable.

SUMMARY OF THE INVENTION

The present invention reduces the buffer storage required for merging new data with read data in a read-modify-write data path of a memory storage system by first latching the new data with associated mask fields into a data output buffer, and then merging read data with the new data in the output buffer according to the latched mask fields. The mask fields comprise bits of data which dictate which portion of the read data is to be replaced with new data, as well known in the art. The appropriate check bits for the ECC are generated and added to the modified data in the data output buffer to produce a new data output which is released from the data output buffer into the memory at the selected address.

DESCRIPTION OF THE PREFERRED EMBODIMENT

Figure 1:
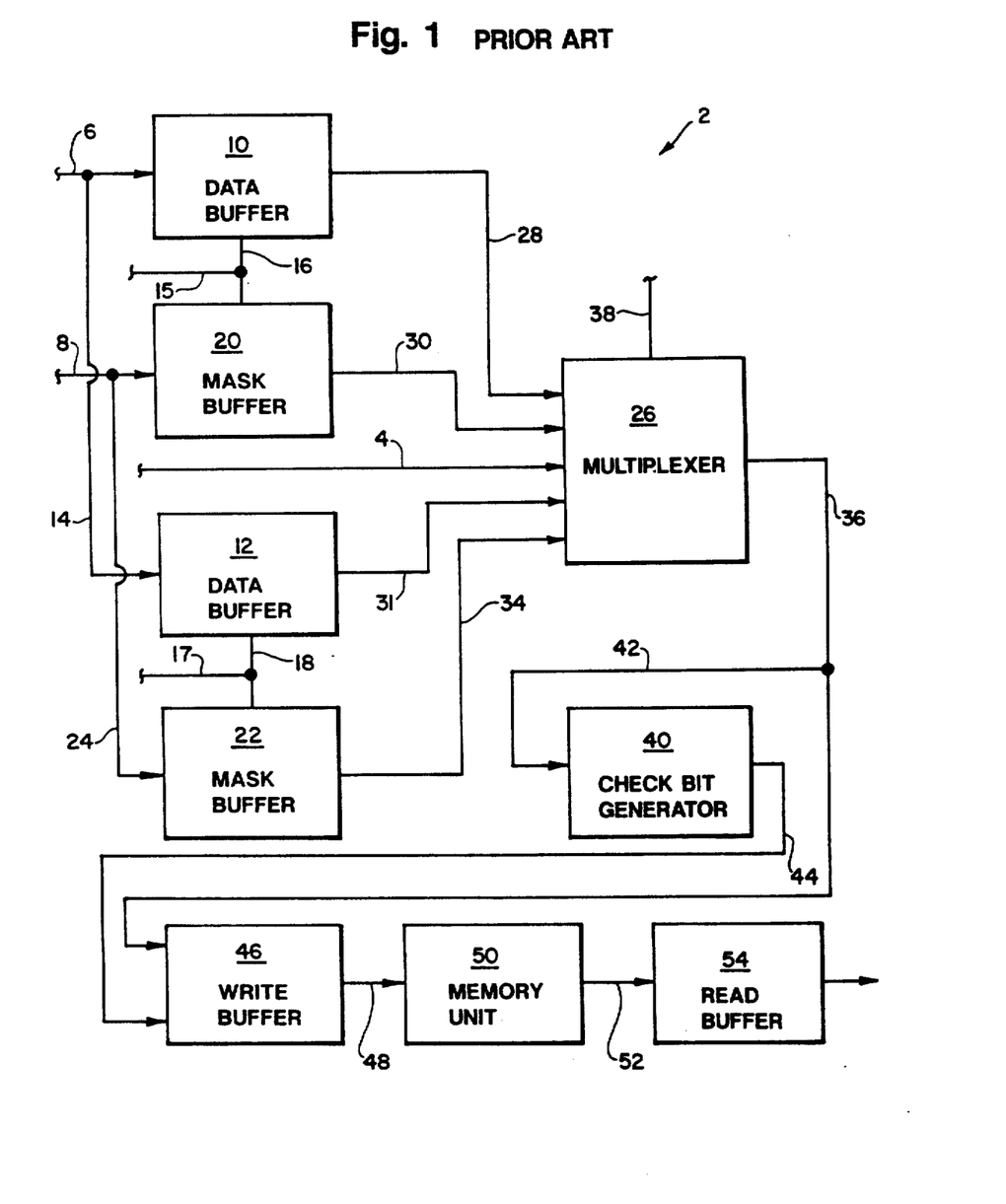
FIG. 1 is a block diagram of a typical prior art read-modify-write memory data path arrangement.

Referring to the drawings, wherein the same reference characters designate like or corresponding parts throughout the views, FIG. 1 shows a general block diagram of a typical read-modify-write system 2 for a memory system according to the prior art. The read-modify-write system 2 includes a read data input line 4 which receives read memory data from the computer memory system (not shown). The system 2 also includes a new data input line 6 for receiving new data from an associated computer system control unit (SCU, not shown) for modifying the read memory data on the line 4. The system 2 additionally includes a mask data line 8, for receiving mask information from the SCU to dictate the portion of the memory read data on the line 4 to be modified with the new data on the line 6. The new input data on the line 6 and the mask data on the line 8 are synchronously transmitted from the SCU in serial form. The new data on the line 6 is typically in the format of consecutive sequential 16 byte writes.

In FIG. 1, provisions are shown for latching two consecutive 16 byte (128 bit) writes of the new data on the line 6 with a 16 byte first new data buffer 10, and a 16 byte second new data buffer 12. The first new data buffer 10 receives new data via the line 6 and the second new data buffer 12 receives the new data on the line 6 via a second data buffer input line 14. The first new data buffer 10 and the second new data buffer 12 are alternatively and consecutively latched with a first latch signal on a first latch line 16 and a second latch signal on a second latch line 18 fed from a timing source (not shown) via timing lines 15 and 17 respectively from the SCU. The timing of the first and second latch signals on the lines 16 and 18 respectively is selected so that alternate consecutive 16 byte writes on the line 6 are fed to the first new data buffer 10 and the second new data buffer 12, respectively.

Each 16 byte write on the line 6 directed to either the first new data buffer 10 or the second new data buffer 12 has an associated mask field simultaneously transmitted on the line 8 from the SCU. The mask fields are typically 16 bits for each 16 byte write of new data on the line 6. A 16 bit first mask buffer 20 is latched by the first latch signal on the first latch line 16 so that the first mask buffer 20 latches a 16 bit mask field on the line 8 corresponding to the 16 bytes of new input data simultaneously latched by the first input buffer 10. A 16 bit second mask buffer 22 is latched by the second latch signal on the second latch line 18 so that the second mask buffer 22 latches a 16 bit mask field on the line 8 via a second mask buffer input line 24 corresponding to the 16 bytes of new input data simultaneously latched by the second input buffer 12. When the first data buffer 10 and the first mask buffer 20 are synchronously unlatched, their latched data is fed to a merging multiplexer 26 via a first data buffer output line 28 and a first mask buffer output line 30, respectively. The merging multiplexer 26 serves to merge the unlatched new data on the line 28 with the read data fed to the multiplexer 26 on the line 4 according to the mask data simultaneously unlatched on the line 30.

Likewise, when the second data buffer 12 and the second mask buffer 22 are synchronously unlatched, their latched data is fed to the merging multiplexer 26 via a second data buffer output line 32 and a second mask buffer output line 34, respectively. Thus, as the second data buffer 12 and the second mask buffer 22 unlatch their outputs, the multiplexer 26 modifies the read data input from the line 4 with the new data input from the line 32 as dictated by the mask data from the line 34. The multiplexer 26 then selectively feeds its fully merged data output on a multiplexer output line 36 in response to a select signal supplied by the SCU timing source on a multiplexer select line 38.

The read data on line 4 modified as described above is typically modified in 64 byte segments, so that the multiplexer 26 provides its fully merged output on the line 36 in corresponding 64 byte segments. This is done so that the fully merged data so provided can be used to generate a new set of 14 corresponding check bits according to the ECC code used in an ECC check bit generator 40, driven by the fully merged data output on the line 36 via a check bit generator input line 42. The check bit generator 40 generates a 14 bit ECC check bit data output on a check bit generator output line 44 which is latched with the corresponding fully merged data output on the line 36 in a 64 bit write data buffer 46. When the write data buffer 46 is unlatched, it produces a fully merged data output with 14 corresponding ECC check bits on a write buffer output line 48, which is written into a memory unit 50, such as a DRAM array. The corresponding data so written in the memory unit 50 may subsequently be read by feeding the output of the memory unit 50 on a memory unit output line 52 through a 64 byte read buffer 54. The output of the read buffer 54 on a read buffer output line 56 may then be recirculated to the line 4 described above for subsequent data modification and rewriting, if required. Each of the above elements are well known components which may be interconnected in a variety of well known configurations and are shown in block form in FIG. 1 for purposes of representation only, since they do not in themselves constitute any part of the present invention.

Figure 2:
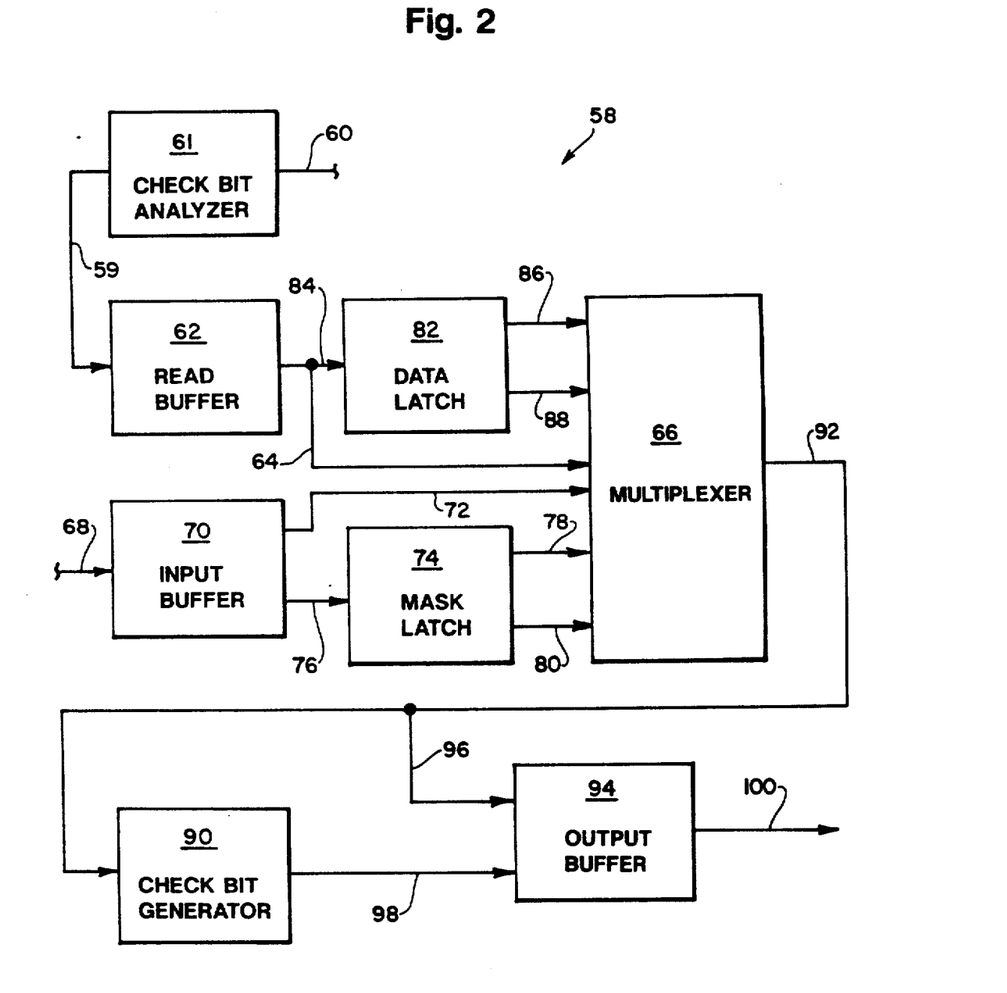
FIG. 2 is a block diagram of a read-modify-write memory data path arrangement according to the present invention.

The present invention reduces the amount of buffer storage required in the memory data path described above. FIG. 2 shows a block diagram of a read-modify-write memory data path system 58 incorporating the present invention. Read data is received from the memory unit data flow path, described herein below, via a read data input line 60.

The read data on the line 60 is fed to the input of a check bit ECC analyser circuit 61. Using check bits sent with the read data, the check bit ECC analyzer 61 validifies the data. It also determines if the read data has correctable error, and corrects it if necessary. The read data is detected and corrected according to any desired ECC using syndromes generated in accordance with the ECC. The check bit analyser 61 is shown in block form because it may comprise any well known type, and it does not itself constitute the present invention.

The ECC code is preferably based upon a longword of data (32 bits), and a total of eight check bits for each longword of data are preferably appended, or combined, with each longword of data. Thus, 40 bits are needed for each longword of data. In the preferred embodiment, read data in quadword (64 bit) segments, representing two longwords of data, are processed at one time. This requires 80 bits of data for each quadword of data that is processed, including the 16 associated check bits.

The corrected read data fed from the output of the check bit analyser 61 on a line 59 is periodically latched by a read data buffer 62 which latches 64 data bits of the 80 bit read data input segments. Since the 16 corresponding ECC check bits of the 80 bit read data input must be changed after read data is modified, they are not latched.

When unlatched, the output of the read data buffer 62 is fed on a read buffer output line 64 either through a merging multiplexer 66 if the read data is not to be modified, or into additional circuitry, as described hereinafter, if the read data is to be modified. The merging multiplexer 66 serves to merge new data input with the read data on the line 64 for the same purpose as the multiplexer 26 in the prior art read-modify-write system 2 described above in connection with FIG. 1.

New data input is received on a new data input line 68. In the preferred embodiment, the new data is received in quadword segments. The new data on the line 68 typically has a 78 bit format with 64 data bits, eight mask bits, four parity bits and two beginning-of-data bits. The new data input on the line 68 has its 64 data bits arranged in two sequential 32 bit data words, and the eight appended mask bits comprise first and second corresponding 4 bit data masks to dictate which portion of the read data input on the line 60 is to be modified by the new data input on the line 68.

The 78 bit segments of the new data on the line 68 are latched by a 78 bit new data and mask buffer 70. When unlatched, the sequential first and second 32 bit data words which have been latched as part of the latched 78 bit new data input in the new data and mask buffer 70 are transferred to the merging multiplexer 66 via a multiplexer input line 72. The mask data that is appended with the new input data is fed to a 32 bit dual octaword mask latch 74 via a mask latch line 76. The mask latch 74 has buffering capacity for two octawords of data, allowing the mask data for two consecutive read-modify-write operations of two quadword data segments each to be stored.

The mask latch 74 sequentially releases the corresponding first and second data masks as it unlatches into the merging multiplexer 66 via a first mask line 78 and a second mask line 80, respectively. The first and second data masks corresponding to each first and second 32 bit data word fed to the multiplexer 66 on the multiplexer input line 72 dictate to the multiplexer 66 which portions of the read data input signal on the line 60 will be modified as part of the read-modify-write process.

To facilitate modification of the read input data as the new and mask data is sequentially unlatched by the new data and mask buffer 70 and the mask latch 74, the read data on the line 64 is fed to a dual 64 bit read data segment latch 82 via a read data latch line 84 which sequentially latches consecutive 64 bit segments of the read data from the line 64. The first and second read data segments latched by the read data latch 82 are sequentially unlatched and fed into the multiplexer 66 via a first read data segment line 86 and a second read data segment line 88. The read data latch 82 is unlatched in synchronization with the new data and mask buffer 70 and the mask latch 74 so that read data is held in the multiplexer 66 while the corresponding new data and mask data is fed to the multiplexer 66 to perform the data merging operation.

The merged 64 bit data segments from the multiplexer 66 are then fed to a check bit generator 90 via a multiplexer output line 92. The check bit generator generates 16 check bits per 64 bit data segment in conformance with the ECC code used. The merged data on the line 92 is also fed to an 80 bit data output buffer 94 via a data buffer input line 96. Simultaneously, the check bit generator 90 feeds its 16 bit check bit output along a check list generator output line 98 into the data output buffer 94. The data output buffer 94 combines the 64 bit merged data segments with their corresponding new 16 ECC check bits to produce corresponding 80 bit write data segments on a data buffer output line 100.

Figure 3:
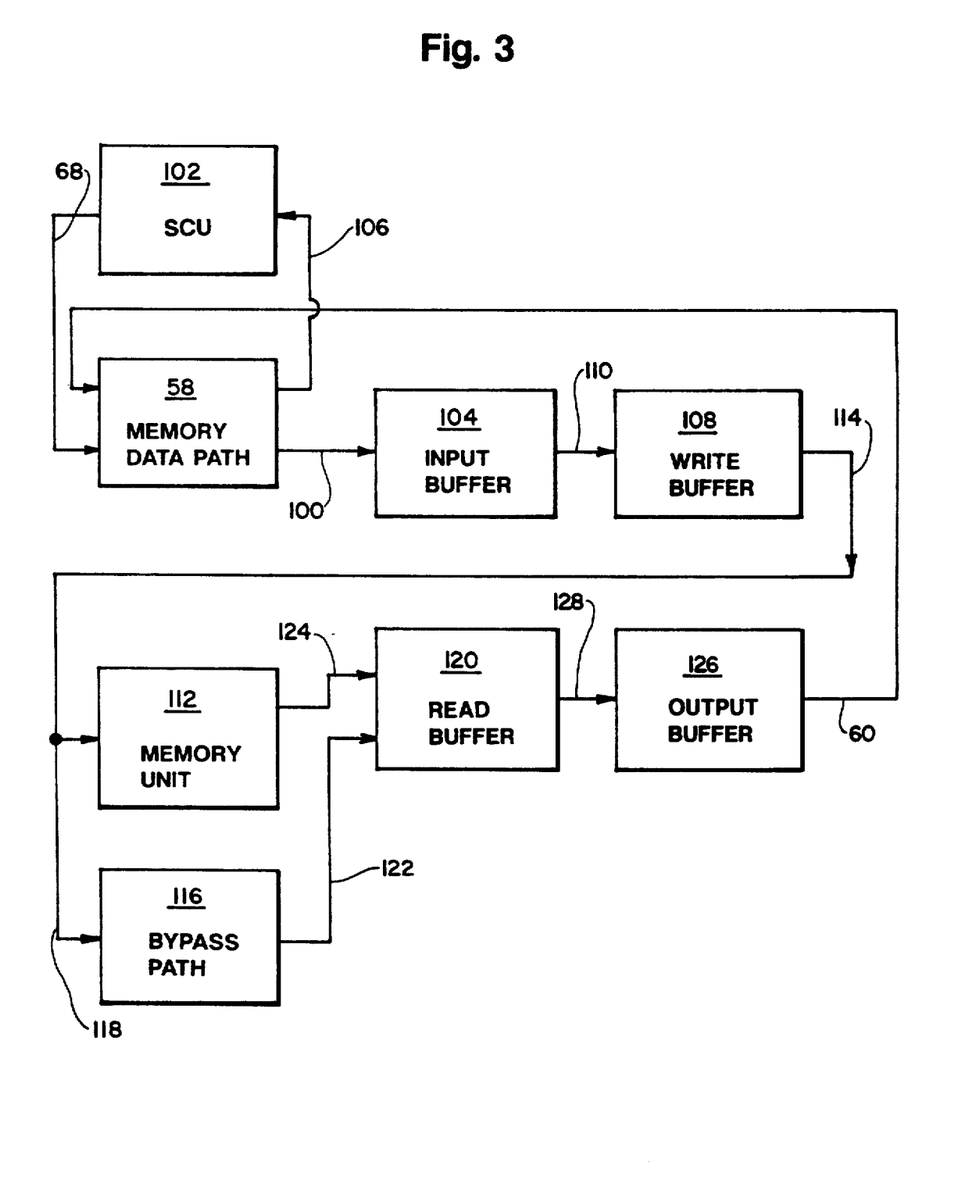
FIG. 3 is a schematic of the preferred embodiment for incorporating the memory data path shown in FIG. 2.

The data merging operation described above is included in a complete read-modify-write memory system as shown in FIG. 3. The memory data path 58 described above has its new data input on the line 68 fed from an associated system control unit (SCU) 102. The output from the memory data path 58 is fed from the line 100 to a 640 bit data input buffer 104, as well as back to the SCU 102 via an SCU input line 106. The data input buffer 104 preferably has sufficient storage capacity for a whole block of data. In the preferred embodiment, a whole block of data comprises 640 bits, including check bits.

After the data input buffer 104 latches a full 640 bits of data from the line 100, its output is unlatched and fed to a 640 write data buffer 108 via a write data buffer input line 110. After the write data buffer 108 latches a full 640 bits of data from the line 110, its output is unlatched into a 640 bit memory unit 112 via a write data buffer output line 114. The memory unit 112 is preferably an array of dynamic random access memory (DRAM) devices. The memory unit 112 stores the data unlatched from the write data buffer 108.

When data is intended to bypass the memory unit 112 for direct reading of modified data, the write data buffer output on the line 114 is fed into a bypass path 116 under control of signals from the SCU (not shown) via a bypass path input line 118 and the output of the bypass path 116 feeds a 640 bit read data buffer 120 via a bypass output line 122. After the read data buffer 120 latches a full 640 bits of data from the bypass output line 122, or from the memory unit 112 via a memory unit output line 124, the output of the read data buffer 120 is unlatched and fed into a data output buffer 126 via a read data buffer output line 128 After the data output buffer 126 latches a full 640 bits of data form the line 128, its output is unlatched in 80 bit data segments and fed back to the memory data path 58 via the line 60 to complete the read-modify-write operation as described above in connection with FIG. 2.

As described above, the data input buffer 104 preferably has enough buffer capacity for a whole block of data, such as a block of 640 bits. The 640 bit block comprises 16 longwords of data with eight associated ECC bits for each longword. The data within each block is generally arranged in quadword segments, with two longwords of data associated with each quadword segment. The data input buffer 104 is preferably distributed into 16 buffers of 40 bits each. In this case, each of the 16 buffers that comprise the data input buffer 104 latch a full longword of data with associated check bits. Thus, two of the buffers 16 store each quadword data segment with associated check bits.

This arrangement allows the data buffer 104 to unlatch all of the quadwords of data that it stores simultaneously, even though received only one quadword at a time from the memory data path 58. Thus, the output of the data input buffer 104 preferably comprises 16 different parallel output ports of 40 bits each, the line 110 comprises 16 distinct 40 bit buses, and the input of the write data buffer 108 comprises 16 different input ports of 40 bits each.

The write data buffer 108 preferably has a 640 port output to allow an entire 640 bit block of data to be fed to the memory unit 112 simultaneously. Likewise, the bypass path 116 preferably has a 640 port input and output to allow an entire 640 bit block of data to be bypassed from the line 118 to the line 122 simultaneously. In this case, the lines 114, 118, 124 and 122 are all 640 bit buses.

Of course, the write buffer 108 may be localized or distributed, and it is preferably distributed into 16 buffers of 40 bits each. Likewise, the bypass path 116 may be localized or distributed, and it is preferably distributed into 16 bypass multiplexers with 40 bit input ports and 40 bit output ports.

The read data buffer 120 preferably has enough buffer capacity for a whole block of data, such as a block of 640 bits. The 640 bit block comprises 8 quadword segments of data with 16 associated ECC bits for each quadword. The read data buffer 120 may be localized or distributed. Each quadword data segment comprises two longword data with 8 corresponding check bits. The read data buffer 120 is preferably distributed into 16 buffers of 40 bits each. In this case, each of the 16 distributed buffers that comprise the read data buffer 120 latches a full longword of data with associated ECC bits.

This arrangement allows the read data buffer 120 to unlatch all of the longwords of data that it stores simultaneously. Thus, the output of the read data buffer 120 preferably comprises 16 different parallel output ports of 40 bits each, the line 128 comprises 16 distinct 40 bit buses, and the input of the data output buffer 126 comprises 16 different input ports of 40 bits each.

The data output buffer 126 may be localized or distributed and it is preferably distributed into 16 buffers of 40 bits each. In this case, each pair of the 16 distributed buffers that comprises the data output buffer 126 latch a full quadword of data with associated ECC data bits. Accordingly, the data buffer 126 performs the function of temporarily storing eight quadwords of data with their associated check bits and selecting the order of their release. This selecting function is preferably implemented with a multiplexer. This configuration allows the data output buffer 126 to release the latched data with ECC bits with the data rearranged quadword by quadword in any desired order. Thus, the data can be "wrapped" as necessary to provide a data output in any requested order.

The output of the data output buffer 126 on the line 60 is preferably 80 bits to release a quadword of data with associated ECC data bits to the read data input of the multiple data path system 58 at one time. This allows the multiple data path system 58 to process a quadword of data, with associated ECC bits, at one time as described above in connection with FIG. 2. Thus, the output of the data output buffer 126 preferably comprises an 80 bit port, and the line 60 is an 80 bit bus.

The read-modify-write system shown in FIG. 3 may be characterized in terms of three distinct data paths. These data paths are the read data path, the write data path and the merging data path. The read data path comprises the data path extending from the output of the memory unit 112 on the line 124, through the read data buffer 120 to the data output buffer 126 via the line 128. The merging data path comprises the data path extending from the output of the data output buffer 126 on the line 60, through the memory data path system 58 and back to the new data input of the data input buffer 104 on the line 100.

The write data path comprises the data path extending from the data input buffer 104, through the line 110, the write data buffer 108 and the line 114 to the write data input of the memory unit 112. New input data is passed from the write data path to the read data path for merging with read data via the data path extending from the output of the write data buffer 108 on the line 118, through the bypass path 116 to the input of the read data buffer 120 on the line 122.

Because the data received by the memory data path system 58 through its read data input on the line 60 is verified with the corresponding check bits combined with it, both the new input data and read data are always verified before the merging operation in the memory data path system 58, as described above in connection with FIG. 2. The new input data is checked upon its second pass through the memory data path system 58 via its read data input coupled to the line 60.

Returning to FIG. 2, the new data and mask buffer 70 preferably comprises a 78 bit buffer to latch the received new input data on the line 68 in quadword data segments with eight combined mask bits four parity bits, and two beginning-of-data bits. As indicated above, each 78 bit new input data segment comprises two longwords of data. Each of the longwords in the new quadword input data segment preferably has its own appended four bit data mask for indicating which portions of associated read data should not be modified by the longword.

The two four bit data masks for the new input data latched in the new data and mask buffer 70 are fed to the dual octaword mask latch 74. Since a four bit mask is used for masking each longword of data, the dual octaword mask buffer 74 comprises a 32 bit buffer to latch masks for four successive quadword data segments of new input data. This permits mask data storage for two consecutive read-modify-write operations of two quadword data segments each.

Both longwords of each quadword segment of the new input data are fed to the new input data input of the merging multiplexer 66 via the line 72. The parity bits and beginning-of-data bits are not passed, so the new data input of the merging multiplexer 66 comprises a 64 bit port and the line 72 comprises a 64 bit bus. The merging multiplexer 66 serves to merge the new data input with read data for the same purpose as the multiplexer 26 in the read-modify-write system 26 according to the prior art described above in connection with FIG. 1.

However, the new input data is simply passed through the merging multiplexer 66 at this point. The new input data is fed from the output of the merging multiplexer 66 to the input of a check bit generator 90 via the line 92. Since the new input data comprises a quadword data segment, the output of the merging multiplexer 66 and the input of the check generator 90 comprise 64 bit ports. Likewise, the line 92 comprises a 64 bit data bus.

The check bit generator 90 generates check bits for the quadword of new input data. Preferably, eight check bits are generated for each longword of new input data on the line 92. The output of the check bit generator 90 is fed to one input of the 80 bit data output buffer 94 via the line 98.

Simultaneously, the corresponding new input data is fed to a second input of the data output buffer 94 via the line 96 coupled to the line 92. The data output buffer 94 latches the new input data and newly generated check bits together and combines them to provide a corresponding 80 bit write data segment from its output on the data buffer output line 100. In this case, the data buffer output line 100 comprises an 80 bit data bus.

The 80 bit write data segment on the line 100 is then passed through the complementary read-modify-write system, described in detail below. The data is not written into memory at this point, but rather returned to the memory data path system 58 via the read data line 60, comprising an 80 bit data bus. The returned write data segment is received by the check bit analyser circuit 6 via the line 60. After checking, and any necessary correction, it is fed to the 80 bit read data buffer 62 and latched.

The returned write data segment is then fed from the output of the read data buffer 62 to the input of the 128 bit dual quadword data latch 82 via the line 84. The dual quadword buffer 82 latches the quadword of data in the returned write data segment, so that only 64 of the 80 bits are latched. The check bits combined with the returned write data segment are discarded.

Since the data latch 82 latches two quadwords of data, two successive retrieved write data segments of one quadword each may be stored. Likewise, since the mask latch 74 latches mask data for two octawords of new input data, four successive returned write data segments of one quadword each may be buffered.

An 80 bit quadword read data segment from the complementary read-modify-write system is then received by the check bit analyser circuit 61 via the line 60. After checking, and any necessary correction, it is passed to read data buffer 62 via the line 59. The quadword read data segment is fed to the read data input of the merging multiplexer 66 via the line 64 coupled to the line 84. Thus, the line 64 comprises a 64 bit bus.

The merging multiplexer 66 merges each quadword of read data in the quadword read data segment with the corresponding one of the two buffered write data quadwords stored in the data latch 82 according to the stored masks. The merged data is then output by the merging multiplexer 66 on the line 92, new check bits are generated by the check bit generator 90, and the merged data and newly generated check bits for the merged data are combined by the data output buffer 94 on the line 100.

As described above, the data received on the line 60 is conveniently verified by analysis of its combined check bits. In this way, the integrity of both the new input data and the read data to be merged with the new input data can be verified before merging in the merging multiplexer 66. This is possible in the case of the new input data because it returns on the line 60 after its first pass through the complementary read-modify-write system.

In an alternative embodiment, the new input data can be stored in the data latch 82 on its first pass through the memory data path system 58. In this case, the new input data is not passed from the write data path to the read data path via the bypass path 116. It simply remains latched in the data latch 82 until read data to be merged with the new input data is latched by the read data buffer 62. The new input data is then merged with the read data in the merging multiplexer 66 in accordance with the mask data latched in the mask latch 74 as described above. The new input data is not validified by the ECC check bit analyzer 61 with this alternative embodiment.

Of course, the read-modify-write system described above in connection with FIG. 3 is independent of the read-modify-write operation, and it does not contribute to the added buffering needed to support read-modify-write operations. The elements described above are well known components which may be interconnected in a variety of well known configurations and are shown in block form in FIGS. 2 and 3 for purposes of representation only, since they do not in themselves constitute any part of the present invention.

Figure 4:
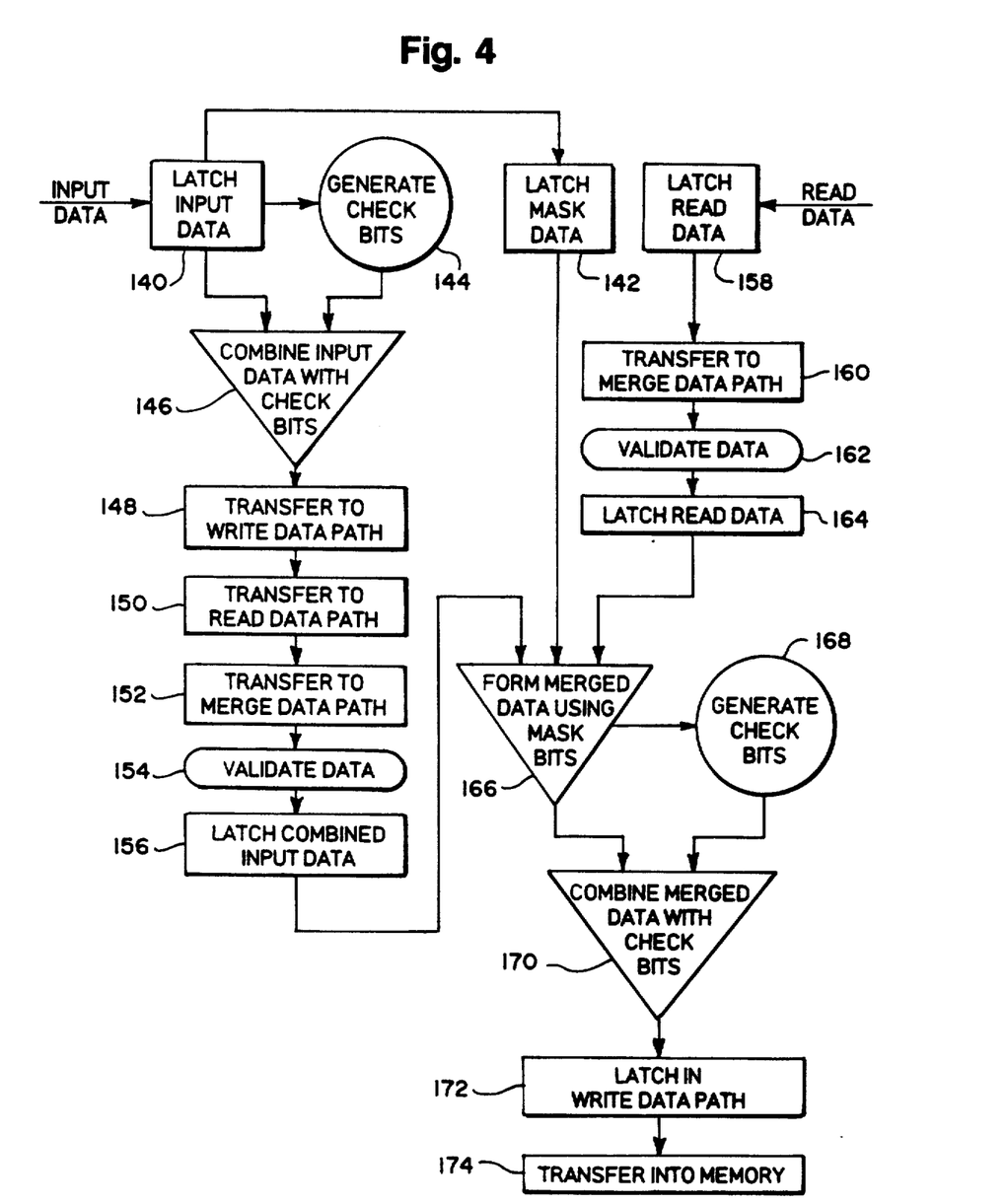
FIG. 4 is a flowchart of a method of reducing buffer storage required for merging read data from a memory with input data, in accordance with the present invention.

FIG. 4 shows a flowchart of a method of reducing buffer storage required for merging read data from a memory with input data for writing into the memory. First, input data including mask data is latched in a merge data path at step 140. The mask data is then separately latched in a mask latch at step 142. The mask data selecting which portion of the read data is to be replaced with new data. Check bits for the input data are generated at step 144 and combined with the input data at steps 144 and 146. Next, the combined input data is transferred from the merge data path to a write data path at step 148, passed from the write data path to a read data path at step 150, and transferred from the read data path to the merge data path at step 152. Finally, the input data is validated st step 154 and latched into a data latch at step 156.

The read data, which is eventually going to be modified, is first latched from the memory in the read data path at step 158. Next, the read data is transferred from the read data path to the merge data path at step 160. Finally, the read data is validated at step 162 and latched into a read buffer at step 164.

In accordance with the mask data, the input data in the merge data path is combined with the read data in the merge data path so as to form merged data at step 166. Check bits for the merged data are generated at step 168 and combined with the merged data at step 170). The combined merged data is then latched in the write path at step 172. The merged data in the write path is subsequently transferred into the memory at step 174.

Thus, the present invention as described above significantly reduces the amount of buffer storage in the memory data path over prior art systems, while still providing buffering capacity for two write commands. It will be understood that various changes in the details, arrangements and configurations of the parts and assemblies which have been described above in order to explain the nature of the present invention may be made by those skilled in the art within the principle and scope of the present invention as expressed in the appended claims.

What is claimed is:

1. A method of reducing buffer storage required for merging read data including first read data check bits from a memory with input data including mask data to modify said read data for writing into said memory, comprising the steps of:
   latching, in a merge data path, said input data and said mask data;
   generating in response to said input data, first input data check bits for said input data;
   combining said first input data check bits with said input data to form combined input data;
   transferring said combined input data from said merge data path to a write data path;
   transferring said combined input data from said write data path to a read data path;
   transferring said combined input data from said read data path to said merge data path;
   receiving, in said merge data path said combined input data and validating said input data;
   latching, in said merge data path, said validated input data;
   latching, in said read data path, said read data including first read data check bits from said memory;
   transferring said read data including first read data check bits from said read data path to said merge data path;
   receiving, in said merge data path, said read data including read data check bits and validating said read data;
   latching, in said merge data path, said validated read data;
   forming merged data, in said merge data path, by combining said validated input data with said validated read data and using said mask data to select which portion of said validated read data is replaced with said validated input data;
   generating in response to said merged data merged data check bits for said merged data;
   combining said merged data check bits with said merged data to form combined merged data;
   transferring said combined merged data from said merge data path to said write data path;
   latching, in said write data path, said combined merged data; and
   writing said combined merged data from said write data path into said memory.

2. The method as set forth in claim 1 wherein said step of validating said input data comprises:
   generating second input data check bits for said input data;
   comparing said first input data check bits with said second input data check bits and indicating the existence of correctable error; and
   correcting said input data if said comparison indicates correctable error.

3. The method as set forth in claim 1 wherein said step of validating said read data comprises:
   generating second read data check bits for said read data;
   comparing said first read data check bits with said second read data check bits and indicating the existence of correctable error; and
   correcting said read data if said comparison indicates correctable error.

4. The method as set forth in claim 1, wherein said step of transferring said combined input data from said write data path to a read data path comprises:
   bypassing said memory.

5. The method as set forth in claim 1 wherein said step of combining said first input check bits comprises:
appending said first input check bits to said input data.

6. The method as set forth in claim 1 wherein said step of combining said merged data check bits comprises:
appending said merged data check bits to said merged data.

7. In a digital computer memory subsystem having a read data path, a write data path, a merge data path, and storage means, a method of merging and validating read data from said storage means with input data including mask data for modifying said read data, comprising the steps of:
generating, in response to said input data in said merge data path, first input data check bits for said input data;
combining said first input data check bits with said input data to form combined input data;
transferring said combined input data from said merge data path to said write data path;
transferring said combined input data from said write data path to said read data path;
transferring said combined input data from said read data path to said merge data path;
receiving, in said merged data path, said combined input data and validating said input data;
latching, in said merge data path, said validated input data;
transferring said read data including first read data check bits from said storage means to said merge data path;
receiving in said merge data path said read data including first read data check bits and validating said read data;
latching, in said merge data path, said validated read data;
forming merged data, in said merge data path, by combining said validated input data with said validated read data and using said mask data to select which portion of said validated read data is replaced with said validated input data;
generating in response to said merged data merged data check bits for said merged data and combining said merged data check bits with said merged data to form combined merged data;
transferring said combined merged data from said merge data path to said write data path; and
writing said combined merged data into said storage means.

8. The method as set forth in claim 7 wherein said step of validating said input data comprises:
generating second input data check bits for said input data;
comparing said first input data check bits with said second input data check bits and indicating the existence of correctable error; and
correcting said input data if said comparison indicates correctable error.

9. The method as set forth in claim 7 wherein said step of validating said read data comprises:
generating second read data check bits for said read data;
comparing said first read data check bits with said second read data check bits and indicating the existence of correctable error; and
correcting said read data if said comparison indicates correctable error.

10. The method as set forth in claim 7, wherein said step of transferring said combined input data from said write data path to said read data path comprises:
bypassing said memory.

11. The method as set forth in claim 7 wherein said step of combining said first input data check bits comprises:
appending said first input data check bits to said input data.

12. The method as set forth in claim 7 wherein said step of combining said merged data check bits comprises:
appending said merged data check bits to said merged data.

13. In a digital computer memory subsystem having a read data path, a write data path, a merge data path, and storage means, apparatus for merging and validating read data including first read data check bits from said storage means with input data including mask data for modifying said read data, comprising:
generating means in said merge data path for receiving said input data and for generating input data check bits for said input data;
buffer means for receiving said input data and said input data check bits and for combining said first input data check bits with said input data to form combined input data and for transferring said combined input data from said merge data path to said write data path;
bypass means in said write data path for receiving said combined input data, for bypassing said storage means and transferring said combined input data from said write data path to said read data path;
first transferring means for receiving said combined input data and for transferring said combined input data from said read data path to said merge data path;
validating means for receiving said combined input data and for validating said input data;
first latch means for receiving and latching said validated input data;
said first transferring means receiving said read data including first read data check bits from said storage means and transferring said read data including first read data check bits to said merge data path;
said validity means receiving said read data including first read data check bits and validating said read data;
second latch means for receiving and latching said validated read data;
forming means in said merge data path for receiving said validated input data, said validated read data and said mask data and for combining said input data with said read data by using said mask data to select which portion of said validated read data is replaced with said validated input data to form merged data;
said generating means receiving said merged data and generating merged data check bits for said merged data;
said buffering means receiving said merged data and said merged data check bits and combining said merged data check bits with said merged data to form combined merged data and transferring said combined merged data from said merge data path to said write data path; and second transferring means for receiving said combined merged data and transferring said combined merged data to said storage means.

14. Apparatus for reducing buffer storage required for merging validated read data from a memory with validated input data and mask data to form merged data including check bits for storage in said memory, comprising:

first latch means in a merge data path for receiving and latching said input data and said mask data;

generating means for receiving said latched input data and for generating input data check bits;

buffer means for receiving and combining said input data check bits and said latched input data and for transferring said combined input data from said merge data path to a write data path;

bypass means in said write data path for receiving said combined input data, for bypassing said memory and transferring said combined input data from said write data path to a read data path;

first transferring means in said read data path for receiving said combined input data and for transferring said combined input data from said read data path to said merge data path;

validating means in said merge data path for receiving said combined input data and for validating said input data;

second latch means in said merge data path for receiving and latching said validated input data;

third latch means in said read data path for receiving and latching said read data from said memory;

said first transferring means receiving said latched read data and transferring said latched read data from said read data path to said merge data path;

said validating means receiving and validating said read data;

fourth latch means in said merge data path for receiving and latching said validated read data;

forming means in said merge data path for receiving said latched validated input data, said latched validated read data and said latched mask data and for combining said validated input data with said validated read data by using said mask data to select which portions of said validated read data is replaced by said validated input data to form merged data;

said generating means receiving said merged data and generating merged data check bits;

said buffer means receiving said merged data check bits and said merged data; combining said merged data check bits with said merged data and transferring said combined merged data from said merged data path to said write data path;

fifth latch means in said write data path for receiving said combined merged data; and write means in said write data path for receiving said latched combined merged data and transferring said combined merged data into said memory.

* * * * *